3,647,862
PREPARATION OF VINYL ESTER-TOLUENE TELOMERS
Joseph K. Hoffman, Oldwick, and James P. Russell, Berkeley Heights, N.J., assignors to Air Products and Chemicals, Inc., Allentown, Pa.
Original application July 31, 1964, Ser. No. 386,593. Divided and this application Dec. 22, 1969, Ser. No. 887,025
Int. Cl. C07c 67/00, 69/16, 69/22
U.S. Cl. 260—491
2 Claims

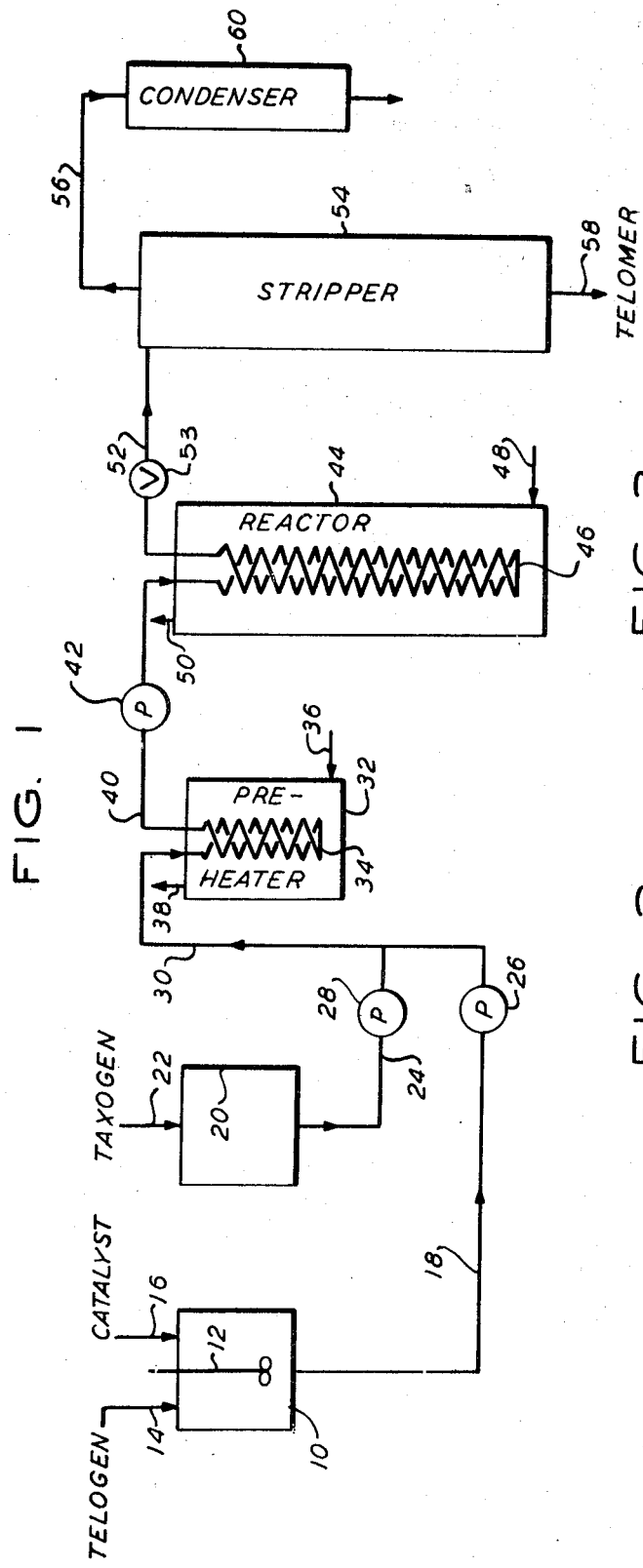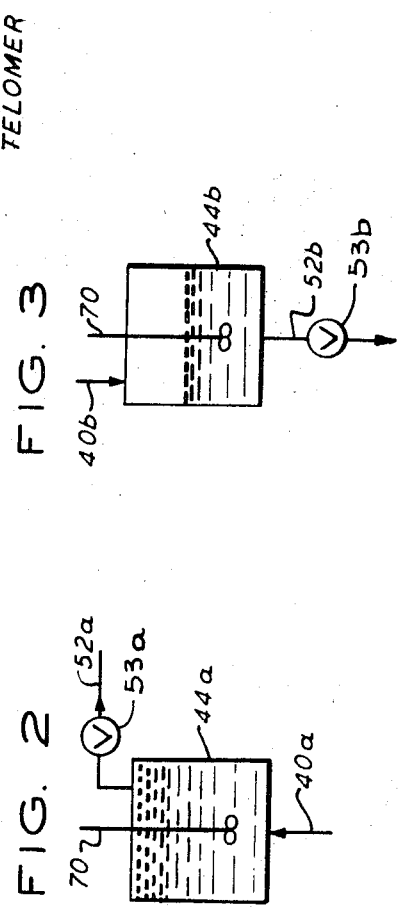

ABSTRACT OF THE DISCLOSURE

Telomers of vinyl esters of lower alkanoic acids, such as vinyl acetate, wherein the telogen is toluene, are produced by reacting the vinyl ester with the telogen at a temperature of 90° to 250° C. and at a pressure of 50 to 7500 p.s.i. in the presence of a free-radical forming catalyst or initiator effective for the polymerization of vinyl acetate, the vinyl ester and the telogen having a residence time in the reaction of 0.5 to 60 minutes, preferably 1 to 10 minutes.

CROSS-REFERENCE TO RELATED APPLICATION

This is a division of co-pending application Ser. No. 386,593 filed July 31, 1964, now abandoned and entitled "Telomers."

This invention relates to the preparation of telomers of vinyl esters and the invention is more specifically concerned with the preparation of vinyl ester telomers which exhibit particularly advantageous properties.

Telomers are the products of the so-called telomerization reaction wherein a telomerizable unsaturated compound, designated as the "taxogen," is reacted under telomerization conditions in the presence of radical-forming catalysts or initiators, with a so-called "telogen." During the reaction, the telogen is split into radicals which attach to the ends of the telomerizing taxogen and, in some cases, add to the double bond of the taxogen and form chains with terminal groups composed of the radicals formed from the telogen. Telomerization is discussed, for example, in Hanford et al. U.S. Pat. 2,418,832 of Apr. 15, 1947. Thus, if the telogen is represented as YZ, telomers can be represented as $Y(A)_nZ$, wherein $(A)_n$ is a divalent radical formed by condensation of the taxogen, $n$ being any integer greater than one, and Y and Z being fragments of the telogen attached to the terminal portions of the radical $(A)_n$.

Telomers are different from copolymers and/or interpolymers. Copolymers and/or interpolymers contain a number of each of two or more different monomer units in the main polymer chain, whereas the fragments of another molecule (the telogen) in telomers appear as units at the terminals of the main telomer chain. Telomerization also differs from simple free-radical addition to the double bond of an olefinic monomer in that more than one molecule of the olefinic monomer appears in the product. The telomerization reaction proceeds in the presence of a free radical initiator which removes an active hydrogen from the telogen. The resulting radical initiates the telomerization by adding to the double bond of the taxogen.

Organic hydrocarbons containing an olefinic double bond, such as ethylene, propylene, hexene, octene, and styrene are normally employed as taxogens, and various compounds have been employed as telogens. It will be understood that within the framework of the "telomerization" process as above defined, it is possible to produce products having very different structures and characteristics, depending upon the taxogen and telogen used and upon the process of telomerization employed. Telomerization and numerous telomers which have heretofore been produced are described in publication No. PB131930, published by the U.S. Department of Commerce, Office of Technical Services, and entitled "Telomerization—A Review of the Literature" by R. B. Fox and D. E. Field.

While some telomers have been formed from vinyl esters, such as vinyl acetate, these monomers have been used only to a very limited extent in telomerization reactions and the resulting products have not had generally satisfactory properties. The telomerization reaction has, accordingly, been used for the most part with other monomeric compounds, especially ethylene and related unsaturated hydrocarbons.

It is an object of this invention to provide novel telomers from vinyl esters such as vinyl acetate.

It is another object of the invention to provide telomers from vinyl esters which exhibit desirable characteristics such as heat stability, and freedom from color.

It is a further object of the invention to provide an improved process for producing telomers of the character indicated.

In accordance with the invention, a vinyl ester of the formula $RCOOCH=CH_2$, wherein R is an alkyl group, especially a lower alkyl group, e.g. having up to 6 carbon atoms, is telomerized by heating it at an elevated temperature of 90° to 250° C. at a pressure of 50 to 7500 p.s.i.g., in the presence of a radical-forming catalyst or initiator and in the presence of a telogen. In a particularly advantageous process in accordance with this invention, the telomerization is carried out under the foregoing conditions of temperature and pressure by continuously passing the vinyl ester, telogen, and catalyst mixture through a telomerization zone wherein the telomerization mixture has a residence time of 0.5 min. to 60 min. preferably 1 min. to 10 min. The pressure in the telomerization zone is maintained at a value within the foregoing range such that the vinyl ester monomer, and the telogen, are continuously in the liquid phase. Advantageously, although not necessarily, the reaction mixture is preheated before introduction into the reaction zone to bring it to within about 20 to 50° C. of the intended reaction temperature and the residence time in the preheating zone is just sufficient to accomplish the desired preheating.

Particularly good results are achieved, and a particularly desirable product is obtained, when the telogen is an aliphatic alcohol containing from 1 to 3 carbon atoms, especially isopropanol. Such telomers can be represented by the formula

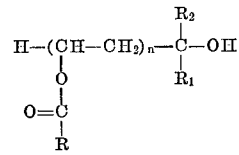

wherein $n$ is an integer having a value of 1 to 150, $R_1$ is a methyl or ethyl radical, and $R_2$ is hydrogen or a methyl radical. However, telomers of vinyl esters, such as vinyl acetate, can also be formed using other telogens, such as lower alkyl esters of lower alkyl carboxylic acids, e.g. ethyl acetate, acetonitrile, toluene, higher alkyl alcohols, such as 2-octanol, or alkyl glycols such as propylene glycol. It is also possible, in accordance with this invention, to form co-telomers in which a vinyl ester and a second taxogen (co-taxogen) are utilized. Co-telomers are mentioned, for example, in the above-identified publication of the Office of Technical Services. Typical co-taxogens which can be used with vinyl esters include crotonic acid, vinyl ethers, such as 2-propyl vinyl ether and n-butyl vinyl ether, propylene, alpha-olefins such as 1-butene, lower alkyl maleates, such as dibutyl maleate, acrylonitrile, vinyl benzoate, vinyl cyclohexene, cyclododecene, vinylidene chloride, acetylene, and the like. In forming co-telomers the ratios between the two taxogens can vary, but the vinyl ester represents at least 25 mol percent, preferably at least 50 mol percent of the combined taxogens.

The ratio between the telogen and the taxogen or taxogens can also vary, but the telogen is always present in an amount of at least 10% by weight of the taxogen or taxogens and preferably at least 30% by weight, and a practical upper limit on the amount of telogen is 90% by weight of the taxogens.

Telomers can be produced in accordance with this invention which have low viscosity and high solvating and plasticizing properties so that they form more fluid bodies at lower temperatures than is possible with the homopolymer or copolymers formed from the taxogen or taxogens alone in the absence of the telogen. As a result, the telomers of this invention are particularly suitable for use in hot-melt-coatings or adhesives for application to paper, leather, and cloth because they do not have to be heated, in order to place them in a sufficiently fluid condition for coating, to temperatures which tend to discolor the resins. The telomers and co-telomers are also useful as plasticizers for elastomers and resins, such as polyvinyl chloride. The preferred vinyl acetate-isopropanol telomer of this invention is a particularly clear, glass-like product and, by varying the ratio of isopropanol to vinyl acetate, it is possible to provide telomers having a wide variety of molecular weights so that they can be easily tailored to various specific hot-melt-coating and plasticizing uses.

As catalysts which are useful in carrying out the reaction of this invention, there can be used any free-radical-forming catalyst or initiator effective for the polymerization of vinyl acetate. Particularly useful catalysts include compounds having directly linked oxygen atoms, e.g. peroxygen compounds such as diacyl peroxides, e.g. benzoyl peroxide, propionyl peroxide, and lauroyl peroxide, dialkyl and dialkylaryl peroxides such as ditertiary-butyl peroxide and di-cumyl peroxide and other peroxides such as ascaridole, diethyl, perdicarbonate, hydrogen peroxide, and tertiary butyl hydro-peroxide. Particularly preferred is di-tertiary-butyl peroxide. U.V. light can be used in conjunction with any compound, which photolizes under the influence of U.V. light to produce radicals; e.g. acetone. Also suitable as catalysts are azo-nitrile catalysts, such as disclosed in Hunt U.S. Pat. No. 2,471,959, e.g. azo-bis-iso-butyronitrile, which is commercially referred to in the art as "AZN."

The amount of catalyst employed can vary, but it is most suitably used in the amount of 0.01 to 5.0% by weight, calculated on the basis of the vinyl ester, preferably 0.1 to 1.0% by weight.

While the process of this invention can be carried out in any convenient apparatus, there are illustrated in the accompanying drawing particularly suitably apparatus systems. In the drawing, FIG. 1 is a dagrammatic view of a continuous telomer preparation and recovery train showing, in particular, apparatus for carrying out the continuous telomerization reaction;

FIG. 2 is a dagrammatic view of the modified form of continuous telomerization vessel which can be substituted for the telomerization vessel in the train of FIG. 1; and FIG. 3 is a diagrammatic view of a batch telomerization vessel for replacing the continuous telomerization vessel in the train of FIG. 1 when batch operation is desired.

Referring to the drawing, and particularly to FIG. 1, the system illustrated includes a telogen supply vessel 10 provided with an agitator 12 and inlets 14 and 16 for the telogen and the catalyst, which are suitably pre-mixed in the vessel 10. The contents of vessel 10 are discharged through an outlet conduit 18. The taxogen, e.g. vinyl acetate, is supplied from a supply vessel 20 having an inlet 22 and an outlet conduit 24. Outlet conduits 18 and 24 are provided with pumps 26 and 28, respectively, which discharge into a common conduit 30 wherein the telogen-catalyst mixture and the taxogen are mixed in the proportions determined by the pumps 26 and 28. Conduit 30 leads to the coil 34 of a continuous coil preheater 32 which is adapted to contain a heat transfer medium, e.g. oil, for maintaining the coil 34 at the desired preheating temperature. Inlet 36 and outlet 38 are provided for circulation of the heat transfer medium through the vessel 32. The outlet end of coil 34 communicates with a conduit 40 containing a pump 42 which leads to the inlet of the coil 46 of the continuous coil reactor or telomerization unit 44 which, like the preheater 32, is adapted to contain a heat transfer medium, e.g. oil, to maintain the coil 46 at the desired reaction temperature. An inlet 48 and an outlet 50 are provided for circulation of the heat transfer medium. The outlet end of the coil 46 is connected to a conduit 52, containing a valve 53, which leads to a distillation or stripping column 54 in which the volatile components of the reaction mixture, e.g. unreacted telogen and/or taxogen are separated from the telomer, the latter being withdrawn through a line 56 and condensed in a condenser 60. The condensate from the condenser 60 is separated and recycled to the system.

Instead of a continuous coil reactor as shown at 44 in FIG. 1, good results can also be obtained with a continuous reactor of the agitator type wherein the reactants are continuously introduced into a continuously-stirred body of the reaction mixture and corresponding amounts of the reaction mixture are continuously withdrawn so that the volume of the body of the reaction mixture remains substantially constant. Such a reaction vessel is shown diagrammatically in FIG. 2, wherein parts corresponding to those shown in FIG. 1 are given the same reference numeral to which *a* has been added. As seen in FIG. 2, a reactor 44a has an inlet 40a at its bottom and an outlet 52a at its top, provided with a valve 53a. The outlet 52a is suitably arranged as shown so that the vessel 44b is always filled with liquid. The vessel 44b is suitably provided with an agitator 70 and is heated in any convenient manner (not shown) as by a jacket, strip heaters, or the like, as well known in the art.

In some cases it may be desirable to carry out telomerization in accordance with this invention in a batchwise manner. In that event, a batch reaction vessel is suitably substituted for the reactor 44 in FIG. 1. FIG. 3 illustrates diagrammatically a typical batch reaction vessel, and in FIG. 3 parts corresponding to those shown in FIG. 1 have been given the same reference numeral to which *b* has been added. Thus, the batch reactor in FIG. 3 comprises a vessel 44b having an inlet 40b and an outlet 52b containing a valve 53b, and is provided with a stirrer 70. Like the reactor 44a shown in FIG. 2, reactor 44 is advantageously provided with heating means (not shown). The reactors of FIGS. 2 and 3 are conveniently in the form of autoclaves.

The objects and features of the invention will be further apparent from the following specific examples of pracical application, it being understood that these examples are given solely by way of illustration and not limitation.

EXAMPLE 1

Using a continuous coil reactor system such as shown in FIG. 1, wherein the preheater coil 34 is made of ¼ in. copper tubing having a volume of 100 ml., and the reactor coil 46 is a ¼ in. copper coil having a volume of 140 ml., a feed stock consisting of 2000 ml. of vinyl acetate and 1000 ml. of 2-propanol containing 5 ml. of di-tert-butyl peroxide, illustrative of a vinyl acetate-propanol ratio of 2:1, is continuously passed through the system. The preheater 32 is maintained at about 135° C. and the reactor temperature is maintained at about 155° C. The pumps 26, 28 and 42 are operated to provide a rate of flow of the telomerization mixture through the system of 14 ml./min., and the valve 53 is controlled to maintain a pressure of 225–250 p.s.i.g. The reaction is continued for about 4 hours. The product is stripped in stripper 54, which is maintained at a temperature of about 175° C., to remove the non-reacted liquids, and the product telomer is collected from the bottom of the stripper in a suitable receiver. At the rate of flow indicated, the residence time of the telomerization mixture is about 7 minutes in the preheater 32 and about 10 minutes in the reactor 44. A typical vinyl acetate-propanol telomer produced in the system and under the conditions described had a molecular weight of about 3000 and was produced with a conversion of about 90%.

The following tabulation shows the results of corresponding operations in which the reactor temperature, the ratio of vinyl acetate to 2-propanol, or the content of catalyst has been varied:

| Ratio | Catalyst (percent weight) | Reactor temp., ° C. | Percent conversion | Telomer, mol. weight |
|---|---|---|---|---|
| 0.5 | 3.3 | 150 | 94.5 | 1,450 |
| 1.0 | 1.0 | 150 | 92.0 | 2,250 |
| 2.0 | 0.5 | 150 | 97.7 | 2,800 |
| 2.5 | 0.5 | 150 | 97.7 | 2,950 |
| 2.1 | 0.25 | 152 | 74.5 | 3,700 |
| 2.1 | 0.25 | 153 | 79 | 3,500 |
| 2.1 | 0.25 | 154 | 86.4 | 3,300 |
| 2.1 | 0.25 | 156 | 94 | 2,700 |

In another series of reactions involving the preparation of a vinyl acetate-isopropanol telomer with the taxogen and the telogen in a 2:1 ratio, using di-t-butyl peroxide as catalyst, the results of varying the residence time, the temperature, and the catalyst were observed, as follows:

| Residence time, min. | Temp., ° C. | Catalyst conc., percent | Product, mol. wt. |
|---|---|---|---|
| 10 | 154 | 0.25 | 2,800 |
| 5 | 158 | 0.5 | 2,250 |
| 2.5 | 175 | 0.5 | 2,260 |
| 1 | 175 | 0.5 | 2,100 |

EXAMPLE 2

The continuous telomerization reaction of this invention is, of course, not limited to equipment of any particular size, or to any specific period of operation, and it can be readily carried out in equipment substantially larger than that described in Example 1, and for long periods of time. The following tabulation shows the results of the preparation of vinyl acetate-2-propanol telomers in operations extending for many hours and with substantial volumes of reactants, the reaction zone being 100 ft. of ¾" tubing. In all cases the catalyst content was 0.25 volume percent, based on the 2-propanol, the pressure was about 265 p.s.i.g., and conversions exceeded 65%.

| Ratio | Flow rate, gals. per min. | Reactor temp., ° C. | Telomer, mol. weight |
|---|---|---|---|
| 1:1.64 | 0.1502 | 150 | 2,750 |
| 1:1.92 | 0.1308 | 153 | 4,800 |
| 1:2.34 | 0.1303 | 152 | 5,700 |
| 1:2.47 | 0.1353 | 157 | 6,000 |
| 1:2.98 | 0.126 | 154 | 7,900 |
| 1:3.46 | 0.107 | 154 | 10,500 |
| 1:3.75 | 0.125 | 160 | 4,525 |

EXAMPLE 3

Although particularly effective results are obtained, in accordance with the invention, by using the continuous coil reactor employed in the foregoing examples, the continuous process of the invention can be modified by using a reactor of the continuous agitator type, as shown in FIG. 2, in a system as illustrated in FIG. 1.

Thus, using a continuous reactor in the form of a 200 cc. stirred autoclave heated to about 150° C., a feed stock consisting of 2000 ml. of vinyl acetate and 2000 ml. of 2-propanol containing 5.0 ml. of di-tert-butyl peroxide is continuously passed through the system. In this system it is generally not necessary to employ pre-heating, and the reactants can be fed directly to the reactor at ambient temperature. Thus, when the continuous overflow reactor 44a, shown in FIG. 2, is employed in the system of FIG. 1, the pre-heater 32 can, if desired, be omitted and the line 30 joined directly to the line 40. In the present example, no pre-heater is used and the feed stock is fed to the autoclave at an ambient temperature of about 25° C. The pressure on the system is about 200 p.s.i.g. and the residence time in the reactor is about 10 minutes. The reaction is continued for about 4 hours and the product is stripped in a stripping zone maintained at a temperature of about 175° C., to remove the non-reacted liquid and the product telomer is collected from the bottom of the stripper in a suitable receiver. A typical vinyl acetate-isopropanol telomer produced in the system, and under the conditions described, had a molecular weight of about 790 and was produced with a conversion of about 92.5%. When the foregoing operation is repeated with variations in ratios, residence times, and times of reaction, the following results are obtained:

| Vinyl acetate:telogen ratio | Residence time, mins. | Telomer, mol. wt. |
|---|---|---|
| 0.5 | 8.5 | 450 |
| 1.5 | ca.10 | 1,175 |

EXAMPLE 4

Using the general system described in Example 3, vinyl acetate-isopropanol telomers were prepared by varying reactant ratios, residence times, and temperatures in a reactor of a capacity of about 43 cubic feet. The pertinent data for these reactions are set forth in the following table:

| Isopropanol:vinyl acetate ratio | Flow rate, gals. per min. | Reactor temp., ° C. | Telomer, mol. wt. |
|---|---|---|---|
| 1:2.49 | 0.2103 | 149 | 4,400 |
| 1:2.49 | 0.2103 | 159 | 3,900 |
| 1:2.49 | 0.2103 | 147 | 4,550 |
| 1:3.75 | 0.125 | 160 | 4,525 |
| 1:3.75 | 0.125 | 154 | 5,600 |
| 1:3.03 | 0.125 | 155 | 5,850 |
| 1:3.75 | 0.95 | 154 | 7,600 |

EXAMPLE 5

This example illustrates the preparation of a vinyl acetate-isopropanol telomer in a batch process, i.e. using a telomerization kettle such as illustrated diagrammatically in FIG. 3. The reactor was a stirred 1 gal. autoclave fitted with an electrically-heated jacket and an internal cooling coil with provisions for air or water cooling. The pre-mixed reagents consisting of 500 ml. vinyl acetate (at 5° C.) 2000 ml. 2-propanol (at 22° C.) and 10 ml. di-t-butyl peroxide (at 5° C.) were charged into the autoclave and the autoclave was flushed twice with 100 p.s.i.g. of nitrogen. The heat was started at 260 volts and kept on until the jacket temperature reached 135° C. The heat was cut back to 160 volts and the temperature controller switched to indicate the inside temperature. When the inside temperature reached 140° air cooling was started. The temperature rose rapidly to 145°. Water cooling was then started and time started. The temperature was controlled at 148–150° by use of alternate cooling and heating for 60 min. The heat was then discontinued and water cooling started. When the inside temperature reached 35° C. the reactor was vented and the charge removed.

The charge was placed in a 1 in. x 14 in. Vigreaux still and stripped of volatiles to a pot temperature of 150° C. The pot was allowed to cool to 110° C. and a vacuum was applied. The product was then vacuum stripped to a pot temperature of 150° C./0.4 mm. The products consisted of 485 g. of telomer of 800 mol. wt. and containing about 94% vinyl acetate, and 20 g. high boiling, volatile by-products, B.P. 62–65°/0.4 mm. The distillate taken off at atmospheric pressure was topped on a 60 plate still giving 12 g. products boiling under 74° C. consisting mainly of vinyl acetate.

The foregoing operations were repeated with varying ratios of telogen to vinyl acetate, with the following results:

| Telogen:vinyl acetate ratio | Telomer, mol. wt. | Amt. vinyl acetate in product |
|---|---|---|
| 1:1 | 1,830 | 93 |
| 2:1 | 1,120 | 95.4 |
| 4:1 | 860 | 93.6 |
| 8:1 | 678 | 91.5 |

EXAMPLE 6

Other telomers and co-telomers of vinyl acetate are similarly produced by the procedures described and illustrated above, with particularly effective results being obtained in the continuous systems. The following table gives pertinent data with respect to a series of runs carried out batchwise with vinyl acetate and telogens other than isopropanol, with the operating data and the characteristics of the product being indicated:

| Telogen | Telogen:vinyl acetate ratio | Residence time, mins. | Reaction temp., °C. | Amount product, g. | Telomer, mol. wt. |
|---|---|---|---|---|---|
| Propylene glycol | 3:1 | 60 | 150 | 80 | 967 |
| 2-octanol | 7:1 | 60 | 170 | 50 | 820 |
| Methanol | 8:1 | 60 | 150 | 243 | 1,100 |
| Ethanol | 8:1 | 60 | 150 | 260 | 700 |
| Toluene | 2:1 | 60 | 150 | 85 | 1,462 |
| Acetonitrile | 1:1 | 60 | 150 | 250 | 4,300 |
| Do | 1:0.5 | 60 | 150 | 130 | 4,500 |

The telomers described above are viscous to hard and brittle products which are non-volatile at temperatures up to 200° C. at a pressure of 0.1 mm. of Hg. Normally, the only volatile component of the reaction mixture consists of unreacted telogen and taxogen. However, in Example 5 the high boiling volatile by-product described, which was also obtained in the case of the last telomer listed in the table, is a 1:1 vinyl acetate-isopropanol telomer. Similarly, in the telomers of methanol and ethanol listed above, there were obtained small amounts of 1:1 telomers, the vinyl acetate-methanol telomer boiling at 55–60° C. at 0.1 mm. of Hg, and the vinyl acetate-ethanol telomer boiling at 60–62° C. at 0.75 mm. of Hg.

As previously indicated, this invention is also concerned with the preparation of co-telomers, i.e. telomers which are formed from a telogen, a lower alkyl vinyl ester, such as vinyl acetate, and another taxogen, viz another unsaturated polymerizable monomer.

The following examples illustrate the preparation of a number of vinyl acetate co-telomers, generally with isopropanol as a telogen but, in some cases, using other telogens. The preparation of these co-telomers was effected by means of the processes described above.

EXAMPLE 7

In this example, propylene was used as the co-taxogen, with isopropanol as the telogen. The following table gives the results of batch operation with the propylene being supplied to the reactor under a pressure of 5000 p.s.i.g. The reactions were carried out at 150° C.

| Telogen (ml.) | Vinyl acetate (ml.) | Propylene (ml.) | Peroxide (g.) | Time (hrs.) | Product (g.) | Vinyl acetate, percent in product | Product, mol. wt. |
|---|---|---|---|---|---|---|---|
| 300 | 100 | 50 | 0.8 | 1 | 93 | 77 | 860 |
| 400 | 50 | 50 | 0.4 | 1 | 33 | 59.4 | 610 |
| 400 | 100 | 25 | 0.8 | 1 | 98 | 83.2 | 676 |
| 400 | 50 | 25 | 0.4 | 1 | 47.5 | 78.4 | 630 |
| 300 | 100 | 50 | 0.9 | 1 | 99.0 | 80.4 | 770 |
| 2,000 | 250 | 125 | 2.2 | 1 | 185 | 79.8 | 700 |
| 400 | 50 | 50 | 0.7 | 1 | 45 | 69.0 | 575 |
| 800 | 100 | 50 | 0.9 | 1 | 95 | 77.6 | 536 |
| 800 | 100 | 100 | 1.6 | 1 | 109 | 73 | 562 |
| 200 | 200 | 200 | 3.2 | 1 | 202 | 78.8 | 2,570 |
| 1,200 | 150 | 225 | 2.4 | 1 | 144 | 67.9 | 580 |
| 100 | 300 | 300 | 4.8 | 1 | 280 | 70.8 | 2,400 |
| 225 | 225 | 340 | 2.2 | 0.5 | 161 | 64.8 | 1,470 |
| 200 | 200 | 300 | 1.5 | 0.25 | 92.8 | 66.8 | 1,540 |
| 200 | 200 | 300 | 0.2 | 1 | 41.6 | 70.9 | 1,760 |
| 300 | 100 | 300 | 0.6 | 0.25 | 31 | 61.8 | 928 |

EXAMPLE 8

In this example the co-taxogen is an alpha-olefin containing from 4 to 10 carbon atoms. The operations described in the following table were carried out at 150° C. with a 1% catalyst (di-t-butyl peroxide) concentration and a 1:1 volume ratio of taxogens:isopropanol, with a 60 minute reaction time.

The reactor used for these operations was a 1-liter stirred autoclave which was electrically heated and fitted with an internal cooling coil, stirrer, and thermocouple well. A stainless steel liner was used to contain the reaction mixture. The reactor was fitted with a pressure gauge and provisions for flushing with dry nitrogen.

The charge, which consisted of vinyl acetate, telogen, catalyst, and co-taxogen was prepared in advance. Volumes of reagents were adjusted so that the total volume charged was between 400 and 500 cc. The charge was placed in the autoclave and the reactor flushed twice with 500 p.s.i.g. $N_2$. A residual pressure of 20 p.s.i.g. $N_2$ was left on the reactor and heating and stirring started. When the temperature reached 135°, the heat was cut back to 30 volts. When the temperature reached 150°, the maximum pressure was recorded (120–180 p.s.i.g.) and time of reaction was started. After 60 min. at 150° (cooling with air or water occasionaly needed) the reaction was rapidly cooled with water, and the charge was removed from the autoclave when the temperature reached 40° C. The product solutions were transferred to a 500 ml. distilling flask and weighed. The product solutions were vacuum stripped on a 14 in. x 1 in. Vigreaux still to a pot temperature of 160–170° C./0.1 mm. Hg.

| Co-taxogen | Mol ratio, vinyl acetate co-taxogen | Product, mol. wt. | Percent olefin in product |
|---|---|---|---|
| 1-decene | 2.4 | 1,250 | 35 |
| 1-octene | 2.0 | 1,350 | 35 |
| 1-hexene | 1.6 | 1,300 | 30 |
| 1-butene | 1.4 | 1,200 | 21 |

In the following table are shown the results of operations carried out as described above, except that greater olefin to vinyl acetate ratios were employed:

| Co-taxogen | Product, mol. wt. | Percent olefin in product |
|---|---|---|
| 1-decene | 1,560 | 53.4 |
| 1-octene | 1,500 | 54 |

EXAMPLE 9

This example shows the use of various co-taxogens and telomers with vinyl acetate. The operations listed in the following table were carried out at 150° C., with a peroxide catalyst concentration of 1%.

| Co-taxogen | Telogen | Co-taxogen (vol. percent) | Taxogen to telogen ratio | Product, mol. wt. | Co-taxogen in product (percent) |
|---|---|---|---|---|---|
| Vinyl cyclohexene | 2-propanol | 50 | 1 | 670 | 40 |
| Cyclododecene | do | 50 | 1 | 1,160 | 17 |
| Iso-butyl vinyl ether | Ethyl acetate | 50 | 1 | 1,240 | 34 |
| Vinylidene chloride | do | 20 | 1.25 | | |
| Acrylonitrile | Toluene | 20 | 1.25 | (*) | (*) |

*\* Two products formed in this reaction: 1. a toluene-soluble 63 g., (mol. wt. 2,900 with 3.4% acrylonitrile; 2. a toluene-insoluble 105 g. (mol. wt. 5,900) with 23.5% acrylonitrile, which is soluble in acetone and acetonitrile.*

EXAMPLE 10

This example illustrates the use of crotonic acid as a co-taxogen with vinyl acetate, employing various telogens, including isopropanol. The data relating to the preparation of the several co-telomers, carried out at 150° C. for 1 hour, are set forth in the following table:

| Crotonic acid in vinyl acetate, percent | Telogen | Ratio, telogen to taxogens | Percent catalyst | Product, mol. wt. | Crotonic acid in product |
|---|---|---|---|---|---|
| 2.5 | Toluene | 1:1 | 3 | 2,400 | 2.7 |
| 5 | do | 1:1 | 3 | 3,350 | 6.1 |
| 5 | do | 1:1 | 1 | 3,000 | 5.7 |
| 5 | do | 1:1 | 0.5 | 3,400 | 6.9 |
| 5 | Ethyl acetate | 1:1 | 0.5 | 5,300 | 6.6 |
| 5 | do | 1:1 | 3 | 4,700 | 5.4 |
| 5 | Isopropanol | 1:1 | 1 | 2,400 | 7.4 |

The foregoing products were produced in a batch operation. The reaction was also carried out in a continuous system such as shown in FIG. 1, at 158° C., with a catalyst concentration of 1% and a residence time of 10 min., using 5 g. of crotonic acid per 100 ml. of vinyl acetate and a telogen to taxogen ratio of 1:1. The following results were obtained:

| Telogen | Product, mol. wt. | Crotonic acid in product |
|---|---|---|
| 2-propanol | 1,900 | 6.1 |
| Toluene | 2,900 | 7.6 |
| Ethyl acetate | 5,200 | 6.4 |

The products were all brittle solids which were soluble in cold 2% aqueous NaOH. The yields were over 98%.

EXAMPLE 11

This example illustrates the use of vinyl ethers as co-taxogens with vinyl acetate, employing various telogens. The data relating to the preparation of the several co-telomers, carried out at 150° C. for 1 hour, using 1% catalyst and a taxogen:telogen ratio of 1:1, are set forth in the following table:

| Co-taxogen | Ratio co-taxogen to vinyl acetate, percent | Telogen | Product, mol. wt. | Percent co-taxogen in product |
|---|---|---|---|---|
| 2-propyl vinyl ether | 25 | Toluene | 2,850 | 11 |
| n-Butyl vinyl ether | 25 | do | 2,200 | 18 |
| Do | 25 | Ethyl acetate | 3,700 | 14 |
| Do | 50 | do | 1,300 | 30 |
| Do | 50 | Toluene | 2,000 | 22 |
| Do | 80 | Ethyl acetate | 950 | 53 |

The foregoing products were produced in a batch operation. This reaction was also carried out in a continuous system, using 20% n-butyl vinyl ether, with 1% catalyst, and a taxogen:telogen ratio of 1:1. The temperature was 155° C. and the residence time 10 min. The product, produced in 80% conversion, had a molecular weight of 3400 and a vinyl ether content of 8%.

EXAMPLE 12

This example shows the use of vinyl benzoate as a co-taxogen with vinyl acetate, employing isopropanol as the telogen. The data relating to the preparation of the several co-telomers, carried out at 150° C. and with a reaction time of one hour, are set forth in the following table:

| Ratio co-taxogen to vinyl acetate | Ratio, telogen to taxogens | Percent catalyst | Product mol. wt. | Character of product |
|---|---|---|---|---|
| 2:3 | 3:1 | 1 | 987 | Solid glass. |
| 2:3 | 8:1 | 1 | 635 | Very viscous. |
| 1:3 | 4:1 | 1 | 907 | Brittle. |
| 1:1 | 7:1 | 1 | 650 | Very viscous. |
| 1:2.5 | 4.5:1 | 1 | 900 | Almost brittle. |

The foregoing telomers container about 30 to 50% of vinyl benzoate.

EXAMPLE 13

In this example acetylene was used as a co-taxogen with vinyl acetate, employing isopropanol and toluene as the telogens. The data relating to the preparation of the co-telomers, at 150° C. with a reaction time of one hour, are set forth in the following table:

| Telogen | Vinyl acetate, g. | Acetylene, p.s.i.g. at 25° C. | Ratio telogen to vinyl acetate | Percent catalyst | Product mol. wt. | Percent vinyl acetate in product |
|---|---|---|---|---|---|---|
| Toluene | 93 | 80 | 3:1 | 1 | 766 | 79 |
| Do | 93 | 50 | 3:1 | 1 | 998 | 88 |
| Do | 93 | 25 | 3:1 | 1 | 1,070 | 86 |
| Do | 93 | 25 | 4:1 | 1 | 836 | 82 |
| Isopropanol | 93 | 80 | 3:1 | 1 | 696 | 80 |

As previously mentioned, telomers, broadly, can be represented by the formula

wherein Y and Z are, as specified above, the fragments of the telogen attached to the terminal portions of the radical $(A)_n$. It will be apparent that co-telomers can be represented by the formula

where $(B)_m$ is the divalent radical formed by condensation of the co-taxogen. More specifically, the vinyl ester co-telomers of this invention can be represented by the formula

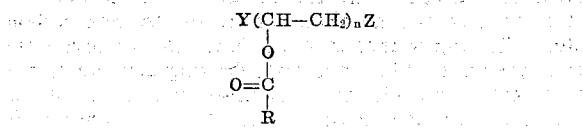

wherein R is an alkyl group, especially a lower alkyl group, and wherein Y and Z are the fragments of the telogen. Similarly, the co-telomers of the invention can be represented by the formula

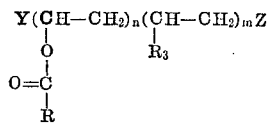

wherein $R_3$ is H or the characteristic radical attached to the group of the co-taxogen linked with the vinyl groups of the vinyl ester taxogen. As previously mentioned, $n$ has a value of 1 to 150, and in the case of co-telomers the value of $m$ would generally be 1 to 150.

One of the features of the processes described above is that not only can telomers be produced in which the integer $n$ in the formulae listed can have a relatively high value, e.g. up to 150, but it is also possible to prepare telomers in which $n$, in these formulae, has a value of 1. These 1:1 telomers have been referred to above in the case of vinyl acetate-methanol, vinyl acetate-ethanol, and vinyl acetate-isopropanol. However, in the previous instances the 1:1 telomers were produced only in small amounts along with higher telomers. In accordance with this invention the 1:1 telomers can be prepared as a major product, by using appropriate conditions. These conditions comprise a high alcohol to vinyl acetate ratio, i.e. at least 8:1, and a high content of catalyst, i.e. at least about 2% based on the vinyl ester in the case of batch operations, and an alcohol to vinyl acetate ratio of at least about 2:1 and a high catalyst content, i.e. at least about 6% in the case of continuous operation. Particularly useful is the vinyl acetate-isopropanol telomer which has the formula

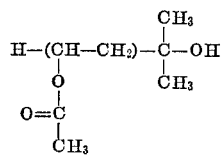

This and the other 1:1 telomers are useful as solvents in paints, lacquers, and other coating compositions containing polymers or telomers, and they are particularly effective as solvents for the non-volatile telomers of this invention. The following examples illustrate the preparation of the above described novel 1:1 vinyl acetate-isopropanol telomer.

EXAMPLE 14

In a stirred autoclave was placed a charge consisting of 3000 ml. of 2-propanol, 300 ml. of vinyl acetate and 6 g. of di-t-butyl peroxide. The autoclave was purged with nitrogen, sealed, and heated to 150° C. for 60 min. The autoclave was then rapidly cooled to 40° C. and discharged, and the product solution was distilled at 760 mm. to a pot temperature of 150° C. The pressure was then reduced to 25 mm. and the fraction boiling at 112° C. at 25 mm. Hg was collected. The yield was 45 ml. of 4-acetoxy-2-methyl-2-butanol, $n_D^{20} = 1.4294$.

EXAMPLE 15

To demonstrate that it is possible to make the product of Example 14 in a continuous process, the overflow reactor system of FIG. 2 was run at 150° C. with a 10 min. residence time on a charge consisting of 5000 ml. of 2-propanol, 2500 ml. of vinyl acetate, and 167 g. of di-t-butyl peroxide. Separation of the products by flash distillation followed by vacuum distillation gave 250 ml. of 4-acetoxy-2-methyl-2-butanol.

It will be apparent to those skilled in the art that various changes and modifications may be made in the embodiments described above without departing from the invention as defined in the appended claims. It is intended, therefore, that all matter contained in the foregoing description and in the drawings shall be interpreted as illustrative only and not as limitative of the invention.

We claim:
1. A process for making telomers of a vinyl ester of a lower alkanoic acid which comprises reacting said vinyl ester in the presence of a free-radical-forming catalyst or initiator with a telogen which is toluene at a temperature of 90° to 250° C. and at a pressure of 50 to 7500 p.s.i., the telogen being present in the amount of 10 to 90% by weight of the vinyl ester, said reaction being carried out in a telomerization zone wherein said vinyl ester and said telogen have a residence time of 0.5 to 60 minutes.

2. A process as defined in claim 1, wherein the residence time is 0.5 to 10 minutes.

References Cited
UNITED STATES PATENTS

| | | | |
|---|---|---|---|
| 2,293,775 | 8/1942 | Soday | 260—488 |
| 2,316,912 | 4/1943 | Soday | 260—488 |
| 2,378,447 | 6/1945 | Soday | 260—488 |

LORRAINE A. WEINBERGER, Primary Examiner

V. GARNER, Assistant Examiner

U.S. Cl. X.R.

117—142, 154; 204—158 HE; 260—31.4 R, 31.6, 465 D, 465.4, 476 R, 484 A, 488 CD, 488 J, 488 R